US009288877B2

(12) United States Patent
Pratt et al.

(10) Patent No.: US 9,288,877 B2
(45) Date of Patent: Mar. 15, 2016

(54) SENSOR MODULE FOR A LIGHTING FIXTURE

(71) Applicant: Cree, Inc., Durham, NC (US)

(72) Inventors: Spencer Scott Pratt, Cary, NC (US); Randy Bernard, Cary, NC (US); Ethan Creasman, Morrisville, NC (US)

(73) Assignee: Cree, Inc., Durham, NC (US)

( * ) Notice: Subject to any disclaimer, the term of this patent is extended or adjusted under 35 U.S.C. 154(b) by 95 days.

(21) Appl. No.: 14/278,443

(22) Filed: May 15, 2014

(65) Prior Publication Data
US 2015/0216017 A1 Jul. 30, 2015

Related U.S. Application Data

(60) Provisional application No. 61/932,051, filed on Jan. 27, 2014.

(51) Int. Cl.
*F21V 23/04* (2006.01)
*H05B 37/02* (2006.01)

(52) U.S. Cl.
CPC ................... *H05B 37/0227* (2013.01)

(58) Field of Classification Search
CPC . H05B 37/0209; H05B 37/0227; F21S 8/038; F21S 8/066; F21V 21/005; F21V 23/003–23/009; F21V 23/0442–23/0492
USPC ............ 362/218, 221, 249.02, 276, 294, 373, 362/802
See application file for complete search history.

(56) References Cited

U.S. PATENT DOCUMENTS

| | | | |
|---|---|---|---|
| 5,126,510 A | 6/1992 | Bauer et al. | |
| 5,869,786 A | 2/1999 | Jaakkola et al. | |
| 6,466,312 B1 | 10/2002 | Li | |
| 7,411,489 B1 | 8/2008 | Elwell et al. | |
| 7,490,960 B1 | 2/2009 | Fiorino et al. | |
| D587,613 S | 3/2009 | Williams et al. | |
| D597,430 S | 8/2009 | Sloan et al. | |
| D621,996 S | 8/2010 | Redfern et al. | |
| D623,344 S | 9/2010 | Tsai | |
| 7,800,049 B2 | 9/2010 | Bandringa et al. | |
| 7,800,498 B2 | 9/2010 | Leonard et al. | |
| D649,688 S | 11/2011 | Trzesniowski | |
| D668,164 S | 10/2012 | Cowles et al. | |
| 8,348,492 B2 | 1/2013 | Mier-Langner et al. | |
| 8,461,510 B2 | 6/2013 | Williams et al. | |
| 8,530,840 B2 | 9/2013 | Carberry et al. | |
| 8,616,720 B2 | 12/2013 | Carney et al. | |

(Continued)

OTHER PUBLICATIONS

Restriction Requirement for U.S. Appl. No. 29/473,157, mailed Mar. 16, 2015, 5 pages.

(Continued)

*Primary Examiner* — Jason M Han
(74) *Attorney, Agent, or Firm* — Withrow & Terranova, P.L.L.C.

(57) ABSTRACT

A sensor module is integrated into a lighting fixture. The sensor module includes one or more environmental sensors and can be readily installed in or removed from the lighting fixture. In one embodiment, a heatsink of the lighting fixture is configured to receive the sensor module. Readings from the environmental sensors may be passed to control electronics associated with the lighting fixture and used to control the light output of the lighting fixture. The readings may also be passed on to other lighting fixtures, which may also use the readings to control their light output.

26 Claims, 15 Drawing Sheets

(56) References Cited

U.S. PATENT DOCUMENTS

| | | |
|---|---|---|
| D698,076 S | 1/2014 | Klus |
| 8,651,711 B2 | 2/2014 | Rudisill et al. |
| D706,152 S | 6/2014 | Ni et al. |
| 8,764,220 B2 | 7/2014 | Chan et al. |
| 2004/0252514 A1 | 12/2004 | Okabe et al. |
| 2007/0229297 A1 | 10/2007 | Leonard et al. |
| 2007/0273290 A1 | 11/2007 | Ashdown et al. |
| 2008/0278079 A1 | 11/2008 | Chen et al. |
| 2009/0046457 A1 | 2/2009 | Everhart |
| 2009/0279298 A1 | 11/2009 | Mier-Langner et al. |
| 2010/0013619 A1 | 1/2010 | Zimmer |
| 2010/0052894 A1 | 3/2010 | Steiner et al. |
| 2010/0277917 A1 | 11/2010 | Shan |
| 2010/0294915 A1 | 11/2010 | Williams et al. |
| 2012/0169507 A1 | 7/2012 | Dyer et al. |
| 2013/0033872 A1 | 2/2013 | Randolph et al. |
| 2013/0200805 A1 | 8/2013 | Scapa et al. |
| 2013/0207528 A1 | 8/2013 | Carberry et al. |
| 2013/0341510 A1 | 12/2013 | Aurongzeb et al. |
| 2014/0001362 A1 | 1/2014 | Huang |
| 2014/0001952 A1 | 1/2014 | Harris et al. |
| 2014/0001962 A1 | 1/2014 | Harris |
| 2014/0043733 A1 | 2/2014 | Huang |
| 2014/0061480 A1 | 3/2014 | Huang |
| 2014/0070710 A1 | 3/2014 | Harris |
| 2014/0239821 A1 | 8/2014 | Leonard |
| 2014/0293646 A1 | 10/2014 | Iwazaki et al. |
| 2014/0313711 A1 | 10/2014 | Hwu et al. |
| 2014/0379305 A1 | 12/2014 | Kumar |
| 2015/0009664 A1 | 1/2015 | Liang |

OTHER PUBLICATIONS

Notice of Allowance for U.S. Appl. No. 29/473,157, mailed Jun. 4, 2015, 7 pages.

Notice of Allowance for U.S. Appl. No. 29/480,523, mailed Jul. 31, 2015, 8 pages.

Non-Final Office Action for U.S. Appl. No. 14/084,183, mailed Jun. 24, 2015, 5 pages.

Notice of Allowance for U.S. Appl. No. 14/084,183, mailed Oct. 20, 2015, 7 pages.

Corrected Notice of Allowance for U.S. Appl. No. 29/480,523, mailed Dec. 4, 2015, 4 pages.

SENSOR MODULE FOR A LIGHTING FIXTURE

PRIORITY APPLICATION

This application claims the benefit of U.S. provisional patent application Ser. No. 61/932,051, filed Jan. 27, 2014, the disclosure of which is incorporated herein by reference in its entirety.

RELATED APPLICATIONS

This application is related to U.S. design patent application Ser. No. 29/480,523, filed Jan. 27, 2014, U.S. patent application Ser. No. 13/868,021, filed Apr. 22, 2013, U.S. patent application Ser. No. 14/084,183, filed Nov. 19, 2013, and U.S. provisional patent application No. 61/932,058, filed Jan. 27, 2014, the disclosures of which are incorporated herein by reference in their entireties.

FIELD OF THE DISCLOSURE

The present disclosure relates to lighting fixtures, and in particular to a sensor module for lighting fixtures that are employed in a lighting network.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based light fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and a special control circuitry to provide uniquely configured signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light, occupancy, temperature, and the like.

With the added intelligence and control based on environmental conditions, there is a need to integrate environmental sensors in an effective and efficient manner in these lighting fixtures.

SUMMARY

The present disclosure relates to the integration of a sensor module into a lighting fixture. The sensor module includes one or more environmental sensors and can be readily installed in or removed from the lighting fixture. In one embodiment, a heatsink of the lighting fixture is configured to receive the sensor module. Readings from the environmental sensors may be passed to control electronics associated with the lighting fixture and used to control the light output of the lighting fixture. The readings may also be passed on to other lighting fixtures, which may also use the readings to control their light output.

In one embodiment, the lighting fixture includes a main structure, a light source provided in the main structure, a heatsink thermally coupled to the light source, and a sensor module coupled to the heatsink. The light source is provided within the main structure, and configured such that light emitted from the light source is directed out of the main structure toward an illuminated area. The heatsink includes an internal surface, which houses the light source and is exposed to the main structure, and an external surface, which is opposite the internal surface and is exposed to the illuminated area. The sensor module is coupled to the external surface of the heatsink. The sensor module may house one or more environmental sensors. For example, the sensor module may house an occupancy sensor, an ambient light sensor, or both.

In one embodiment, a sensor module for a lighting fixture includes a housing, at least one environmental sensor, a lens, and a connection mechanism. The at least one environmental sensor is exposed through the housing of the sensor module and is covered by the lens, which is attached to the housing. The connection mechanism is configured to engage a heatsink on the lighting fixture. According to different embodiments, the at least one environmental sensor may be an occupancy sensor or an ambient light sensor.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

The present disclosure relates to the integration of a sensor module into a lighting fixture. The sensor module includes one or more environmental sensors and can be readily installed in or removed from the lighting fixture. In one embodiment, a heatsink of the lighting fixture is configured to receive the sensor module. Readings from the environmental sensors may be passed to control electronics associated with the lighting fixture and used to control the light output of the lighting fixture. The readings may also be passed on to other lighting fixtures, which may also use the readings to control their light output.

Figure 1:
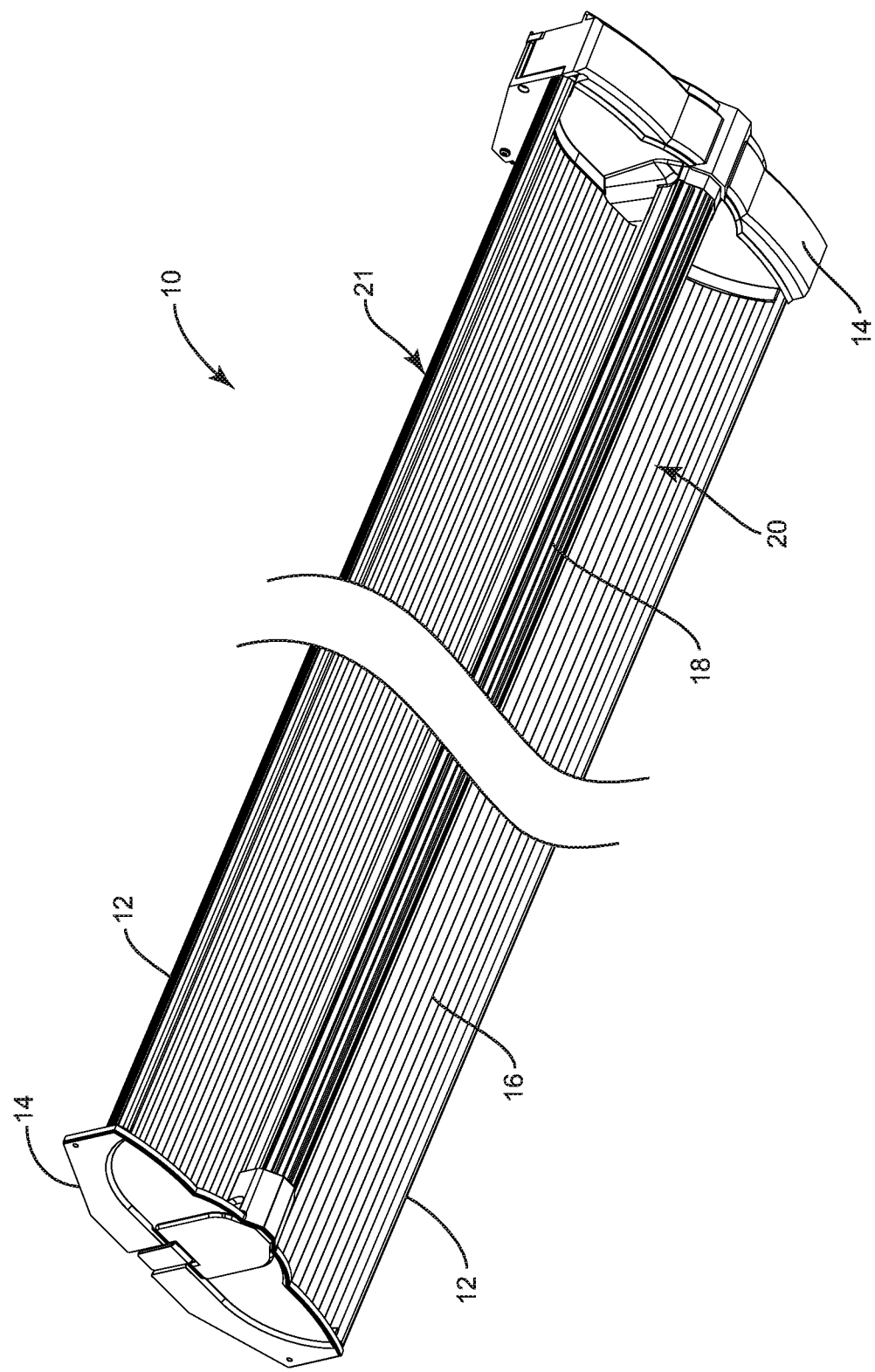
FIG. 1 is a perspective view of a troffer-type lighting fixture according to one embodiment of the disclosure.

Turning now to FIG. 1, a general overview of an exemplary lighting fixture is provided. While the concepts of the present disclosure may be employed in any type of lighting system, the immediately following description describes these concepts in a troffer-type lighting fixture, such as the lighting fixture 10 in FIGS. 1-3. This particular lighting fixture is substantially similar to the CR and CS series of troffer-type lighting fixtures that are manufactured by Cree, Inc. of Durham, N.C.

While the disclosed lighting fixture 10 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Reference is made to co-pending and co-assigned U.S. patent application Ser. No. 13/589,899 filed Aug. 20, 2012, Ser. No. 13/649,531 filed Oct. 11, 2012, Ser. No. 13/606,713 filed Sep. 7, 2012, now U.S. Pat. No. 8,829,800, and Ser. No. 14/084,183, filed Nov. 19, 2013, the contents of which are incorporated herein by reference in their entireties. Further, the functionality and control techniques described below may be used to control different types of lighting fixtures, as well as different groups of the same or different types of lighting fixtures at the same time.

Figure 2:
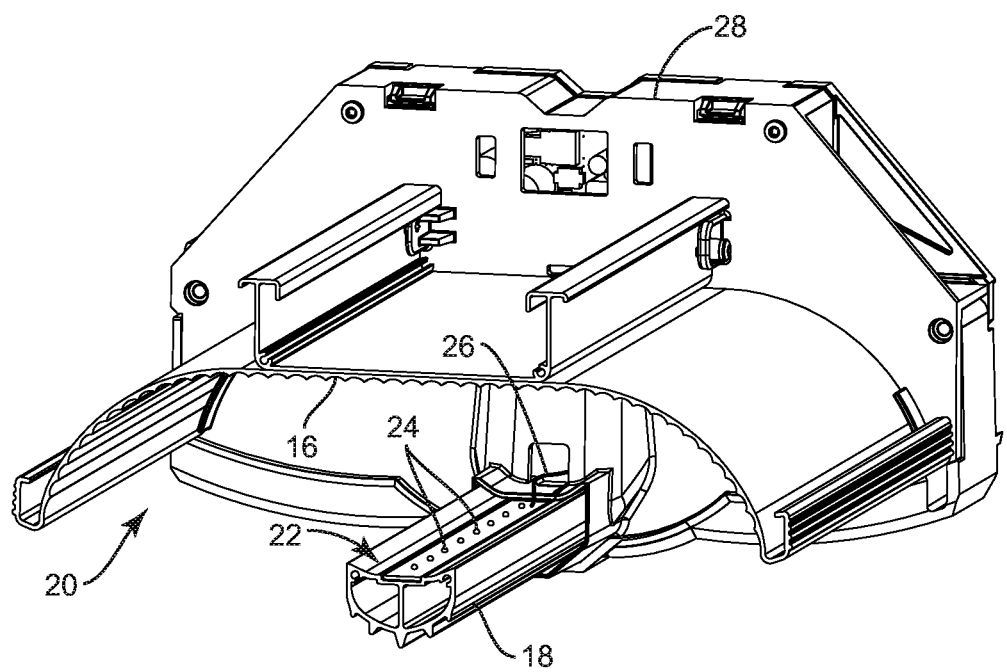
FIG. 2 is a cross section of the lighting fixture of FIG. 1.
Figure 3:
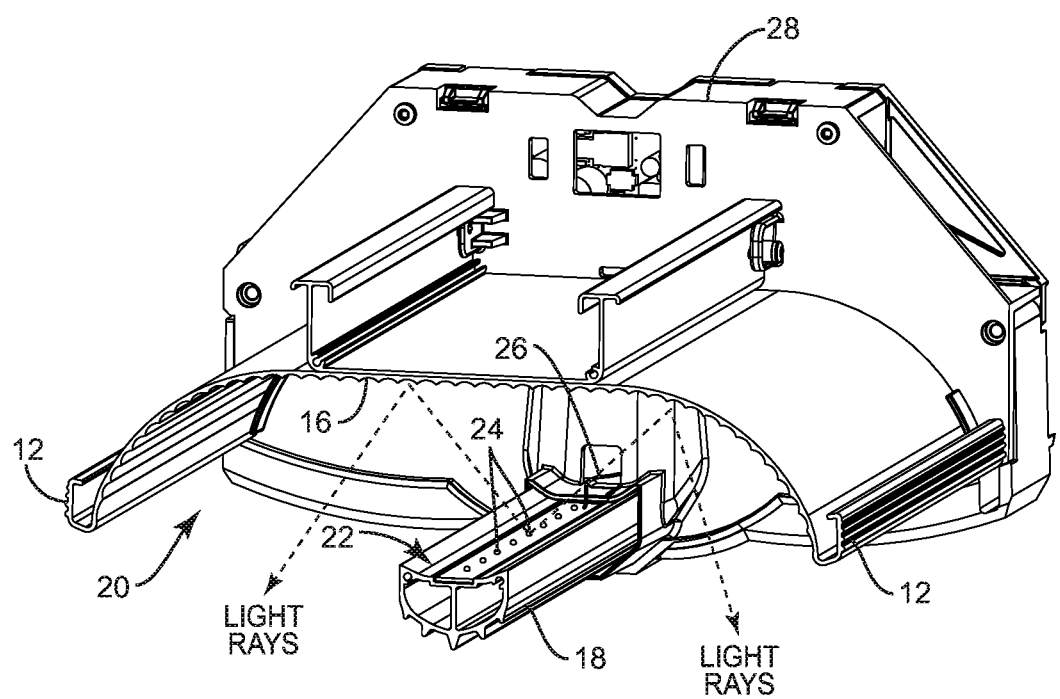
FIG. 3 is a cross section of the lighting fixture of FIG. 1 illustrating how light emanates from the LEDs of the lighting fixture and is reflected out of the lighting fixture.

In general, troffer-type lighting fixtures, such as the lighting fixture 10, are designed to hang from a ceiling. As illustrated in FIGS. 1-3, the lighting fixture 10 includes an outer frame 12, a pair of end caps 14, a reflective surface 16, and a heatsink 18. The reflective surface 16 extends between each edge of the outer frame 12 and the pair of end caps 14, such that the reflective surface 16 forms a concave light-mixing chamber 20. The heatsink 18 runs between the pair of end caps 14, each of which is attached to a different longitudinal edge of the outer frame 12. Together, the outer frame 12, the pair of end caps 14, and the reflective surface 16 may be referred to as a main structure 21 of the lighting fixture 10.

Turning now to FIGS. 2 and 3 in particular, an internal surface 22 of the heatsink 18 provides a mounting structure for an LED array 24, which includes one or more rows of individual LEDs mounted on an appropriate substrate. The LEDs are oriented to primarily emit light upwards toward the reflective surface 16. The volume bounded by the reflective surface 16 and the internal surface 22 of the heatsink 18 provides the concave light-mixing chamber 20. As such, light will emanate upwards from the LEDs of the LED array 24 toward the reflective surface 16 and will be reflected downward, as illustrated in FIG. 3. Notably, not all light rays emitted from the LEDs will reflect directly off the reflective surface 16 with a single reflection. Many of the light rays will bounce around within the concave light-mixing chamber 20 and effectively mix with other light rays, such that a desirably uniform light is emitted from the lighting fixture 10.

Those skilled in the art will recognize that the type of LEDs, the shape of the reflective surface 16, and any coating on the reflective surface, among many other variables, will affect the quantity and quality of light emitted by the lighting fixture 10. As will be discussed in greater detail below, the LED array 24 may include LEDs of different colors, wherein the light emitted from the various LEDs mixes together to form a white light having a desired color temperature and quality based on the design parameters for the particular embodiment.

As is apparent from FIGS. 2 and 3, elongated fins of the heatsink 18 may be visible from the bottom of the lighting fixture 10. Placing the LEDs of the LED array 24 in thermal contact along the internal surface 22 of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for the lighting fixtures 10 in which the concepts of the present disclosure are applicable.

Figure 4:
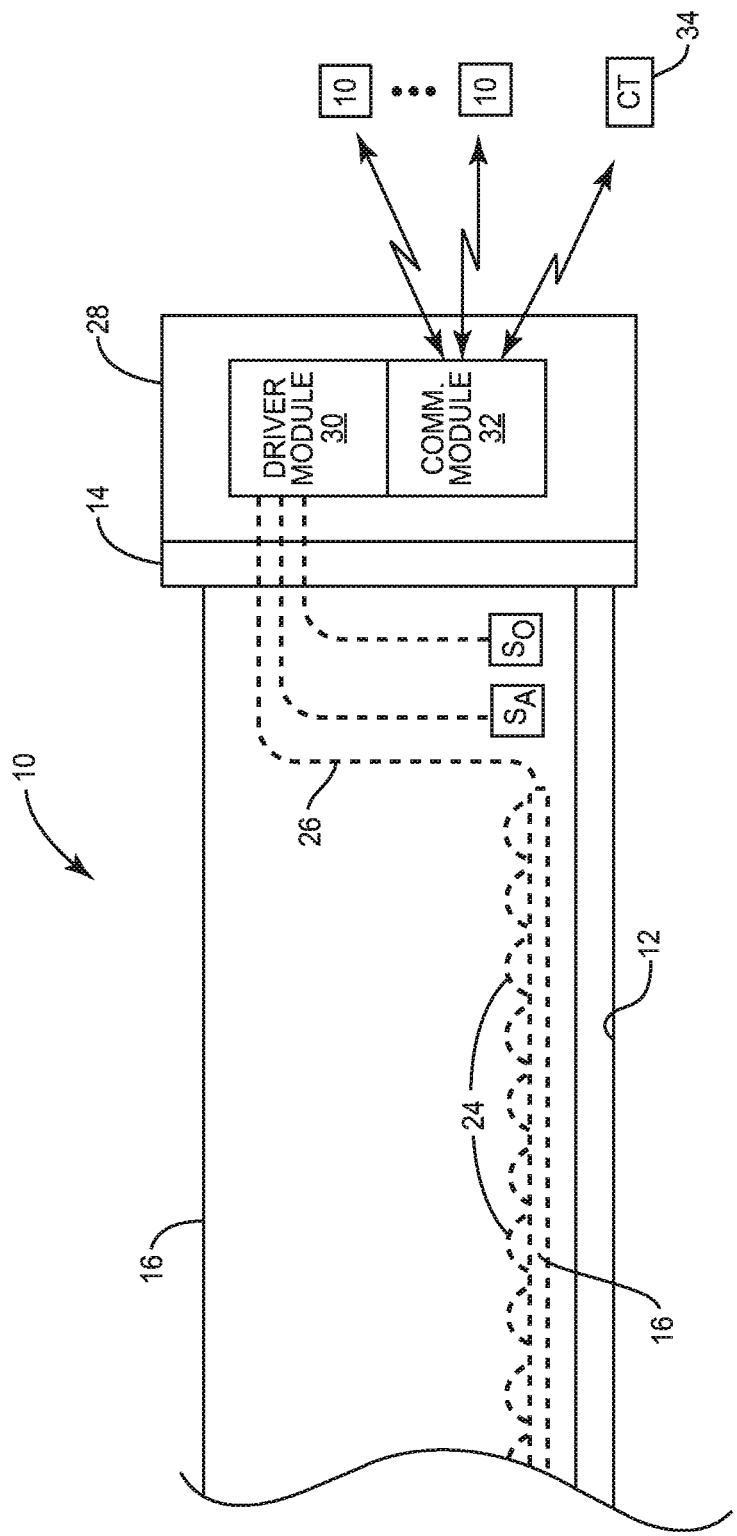
FIG. 4 illustrates a driver module and a communications module integrated within an electronics housing of the lighting fixture of FIG. 1.

With continued reference to FIGS. 2 and 3, an electronics housing 28 is shown mounted to one of the pair of end caps 14, and is used to house all or a portion of the electronics used to power and control the LED array 24. These electronics are coupled to the LED array 24 through appropriate cabling 26. With reference to FIG. 4, the electronics provided in the electronics housing 28 may be divided into a driver module 30 and a communications module 32.

At a high level, the driver module 30 is coupled to the LED array 24 through the cabling 26 and directly drives the LEDs of the LED array 24 based on control information provided by the communications module 32. In one embodiment, the driver module 30 provides the primary intelligence for the lighting fixture 10 and is capable of driving the LEDs of the LED array 24 in a desired fashion. The driver module 30 may be provided on a single, integrated module or divided into two or more sub-modules depending on the desires of the designer.

When the driver module 30 provides the primary intelligence for the lighting fixture 10, the communications module 32 acts as an intelligent communication interface that facilitates communications between the driver module 30 and other lighting fixtures 10, a remote control system (not shown), or a portable handheld commissioning tool 34, which may also be configured to communicate with a remote control system in a wired or wireless fashion.

Alternatively, the driver module 30 may be primarily configured to drive the LEDs of the LED array 24 based on instructions from the communications module 32. In such an embodiment, the primary intelligence of the lighting fixture 10 is provided in the communications module 32, which effectively becomes an overall control module with wired or wireless communication capability, for the lighting fixture 10. The lighting fixture 10 may share sensor data, instructions, and any other data with other lighting fixtures 10 in the lighting network or with remote entities. In essence, the communications module 32 facilitates the sharing of intelligence and data among the lighting fixtures 10 and other entities.

In the embodiment of FIG. 4, the communications module 32 may be implemented on a separate printed circuit board (PCB) than the driver module 30. The respective PCBs of the driver module 30 and the communications module 32 may be configured to allow the connector of the communications module 32 to plug into the connector of the driver module 30, wherein the communications module 32 is mechanically mounted, or affixed, to the driver module 30 once the connector of the communications module 32 is plugged into the mating connector of the driver module 30.

In other embodiments, a cable may be used to connect the respective connectors of the driver module 30 and the communications module 32, other attachment mechanisms may be used to physically couple the communications module 32 to the driver module 30, or the driver module 30 and the communications module 32 may be separately affixed to the inside of the electronics housing 28. In such embodiments, the interior of the electronics housing 28 is sized appropriately to accommodate both the driver module 30 and the communications module 32. In many instances, the electronics housing 28 provides a plenum rated enclosure for both the driver module 30 and the communications module 32.

Figure 5:
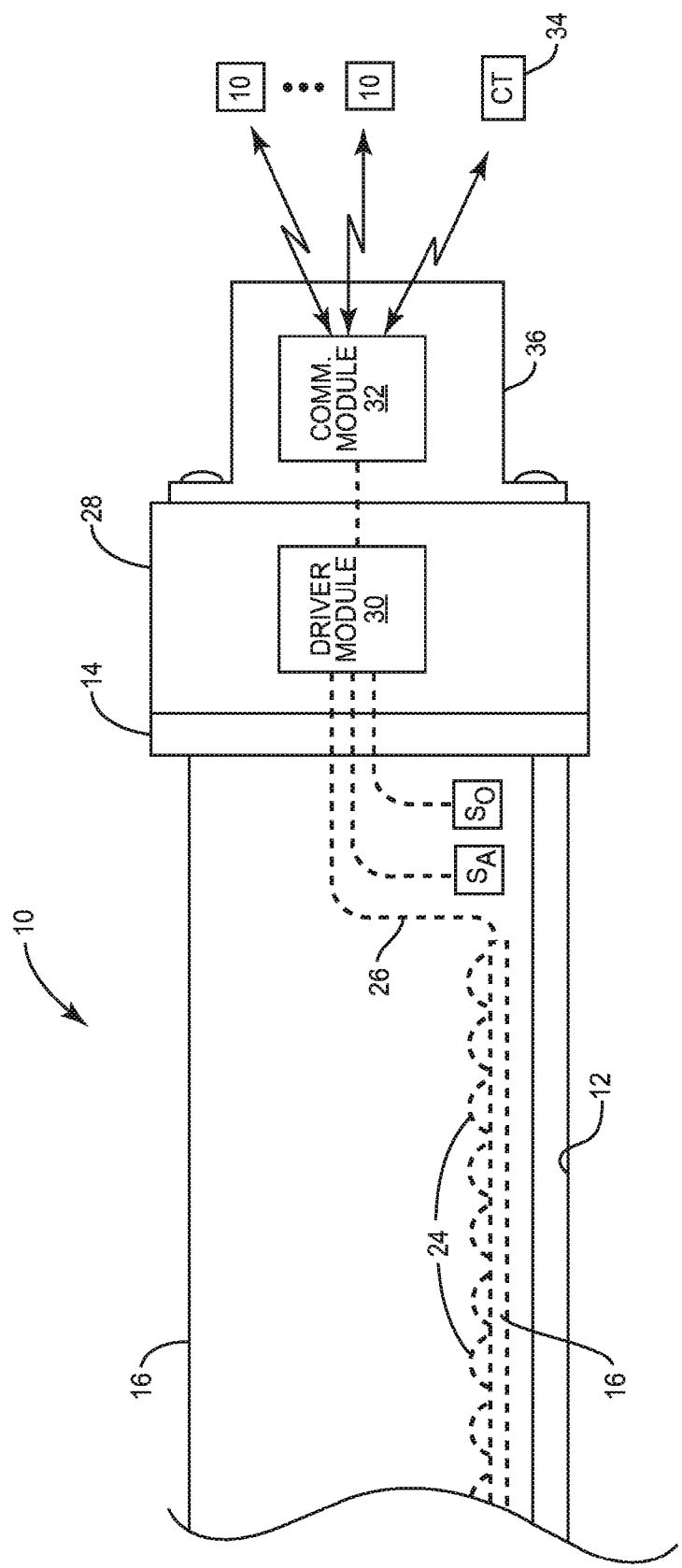
FIG. 5 illustrates a driver module provided in an electronics housing of the lighting fixture of FIG. 1 and a communications module in an associated housing coupled to the exterior of the electronics housing according to one embodiment of the disclosure.

With the embodiment of FIG. 4, adding or replacing the communications module 32 requires gaining access to the interior of the electronics housing 28. If this is undesirable, the driver module 30 may be provided alone in the electronics housing 28. The communications module 32 may be mounted outside of the electronics housing 28 in an exposed fashion or within a supplemental housing 36, which may be directly or indirectly coupled to the outside of the electronics housing 28, as shown in FIG. 5. The supplemental housing 36 may be bolted to the electronics housing 28. The supplemental housing 36 may alternatively be connected to the electronics housing 28 using snap-fit or hook-and-snap mechanisms. The supplemental housing 36, alone or when coupled to the exterior surface of the electronics housing 28, may provide a plenum rated enclosure.

In embodiments where the electronics housing 28 and the supplemental housing 36 will be mounted within a plenum rated enclosure, the supplemental housing 36 may not need to be plenum rated. Further, the communications module 32 may be directly mounted to the exterior of the electronics housing 28 without any need for a supplemental housing 36, depending on the nature of the electronics provided in the communications module 32, how and where the lighting fixture 10 will be mounted, and the like. The latter embodiment wherein the communications module 32 is mounted outside of the electronics housing 28 may prove beneficial when the communications module 32 facilitates wireless communications with the other lighting fixtures 10, the remote control system, or other network or auxiliary device. In essence, the driver module 30 may be provided in the plenum rated electronics housing 28, which may not be conducive to wireless communications. The communications module 32 may be mounted outside of the electronics housing 28 by itself or within the supplemental housing 36 that is more conducive to wireless communications. A cable may be provided between the driver module 30 and the communications module 32 according to a defined communication interface. As an alternative, which is described in detail further below, the driver module 30 may be equipped with a first connector that is accessible through the wall of the electronics housing 28. The communications module 32 may have a second connector, which mates with the first connector to facilitate communications between the driver module 30 and the communications module 32.

The embodiments that employ mounting the communications module 32 outside of the electronics housing 28 may be somewhat less cost effective, but provide significant flexibility in allowing the communications module 32 or other auxiliary devices to be added to the lighting fixture 10, serviced, or replaced. The supplemental housing 36 for the communications module 32 may be made of a plenum rated plastic or metal, and may be configured to readily mount to the electronics housing 28 through snaps, screws, bolts, or the like, as well as receive the communications module 32. The communications module 32 may be mounted to the inside of the supplemental housing 36 through snap-fits, screws, twist-locks, and the like. The cabling and connectors used for connecting the communications module 32 to the driver module 30 may take any available form, such as with standard category 5/6 (cat 5/6) cable having RJ45 connectors, edge card connectors, blind mate connector pairs, terminal blocks and individual wires, and the like. Having an externally mounted communications module 32 relative to the electronics housing 28 that includes the driver module 30 allows for easy field installation of different types of communications modules 32 or modules with other functionality for a given driver module 30.

As illustrated in FIG. 5, the communications module 32 is mounted within the supplemental housing 36. The supplemental housing 36 is attached to the electronics housing 28 with bolts. As such, the communications module 32 is readily attached and removed via the illustrated bolts. Thus, a screwdriver, ratchet, or wrench, depending on the type of head for the bolts, is required to detach or remove the communications module 32 via the supplemental housing 36.

Figure 6A:
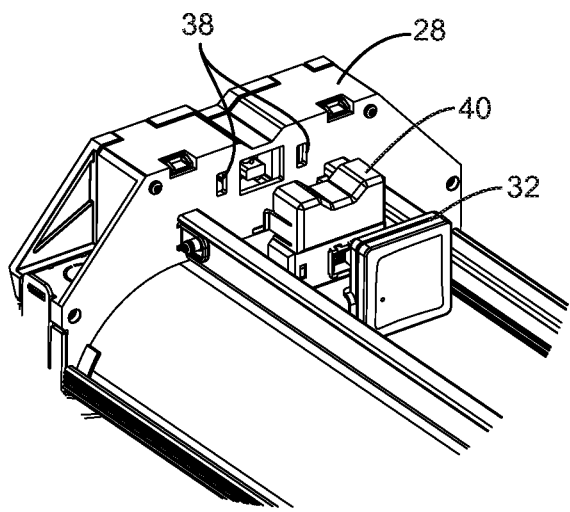
FIGS. 6A-6C respectively illustrate a communications module according to one embodiment before and after being attached to the housing of the lighting fixture.
Figure 6B:
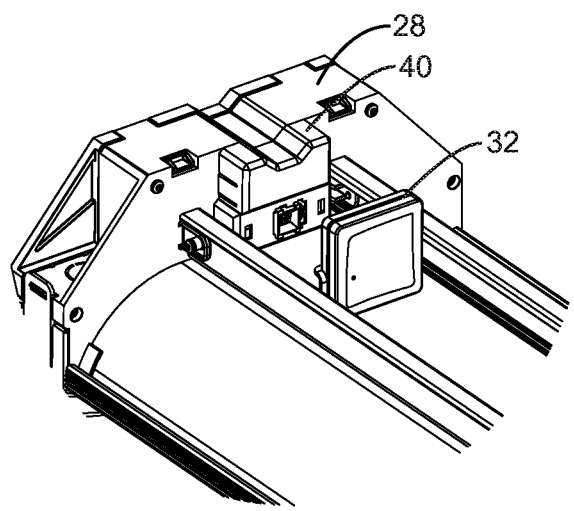
Figure 6C:
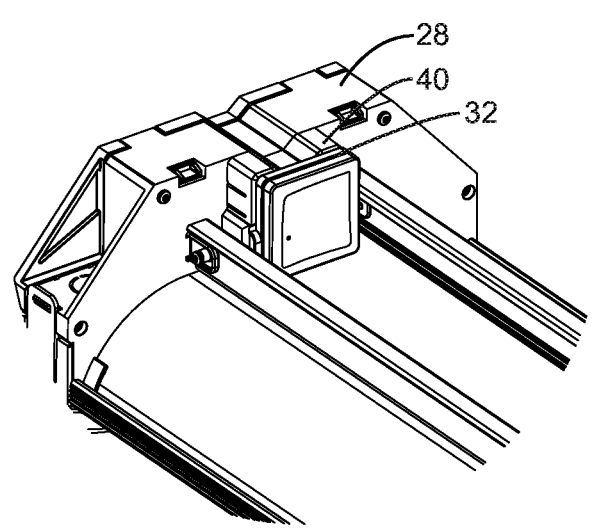

As an alternative, the communications module 32 may be configured as illustrated in FIGS. 6A through 6C. In this configuration, the communications module 32 may be attached to the electronics housing 28 of the lighting fixture 10 in a secure fashion and may subsequently be released from the electronics housing 28 without the need for bolts using available snap-lock connectors, such as illustrated in U.S. patent application Ser. No. 13/868,021, which was previously incorporated herein by reference. Notably, the rear of the communication module housing includes a male (or female) snap-lock connector (not shown), which is configured to securely and releasably engage a complementary female (or male) snap-lock connector 38 on the electronics housing 28. An adapter plate 40 may be required in some embodiments to offset the communications module 32 from the electronics housing 28. This may allow the communications module 32 to properly mate with the electronics housing 28, as well as avoid problematic interference from the driver module 30 within the electronics housing 28.

FIG. 6A illustrates the adapter plate 40 and the communications module 32 prior to being attached to or just after being released from the electronics housing 28 of the lighting fixture 10. As illustrated, one surface of the electronics housing 28 of the lighting fixture 10 includes the snap-lock connector 38, which includes a female electrical connector that is flanked by openings that extend into the electronics housing 28 of the lighting fixture 10. The openings correspond in size and location to the locking members (not shown) on the back of the adapter plate 40. Further, the female electrical connector leads to or is coupled to a PCB of the electronics for the driver module 30. In this example, the adapter plate 40 is configured to extend the female electrical connector, and provide an offset between the communications module 32 and the electronics housing 28. The male electrical connector of the communications module 32 is configured to engage the female electrical connector of the adapter plate 40, which is mounted to the electronics housing 28 of the lighting fixture 10.

As the adapter plate 40 and the communications module 32 are snapped into place on the electronics housing 28 of the lighting fixture 10, as illustrated in FIGS. 6B and 6C, respectively, the male electrical connector of the communications module 32 will engage the female electrical connector of the driver module 30 as the fixture locking members of the adapter plate 40 and the communications module 32 engage the respective openings of the locking interfaces in the electronics housing 28. At this point, the communications module 32 is snapped into place to the electronics housing 28 of the lighting fixture 10, and the respective male and female connectors of the communications module 32 and the driver module 30 are fully engaged.

Figure 7:
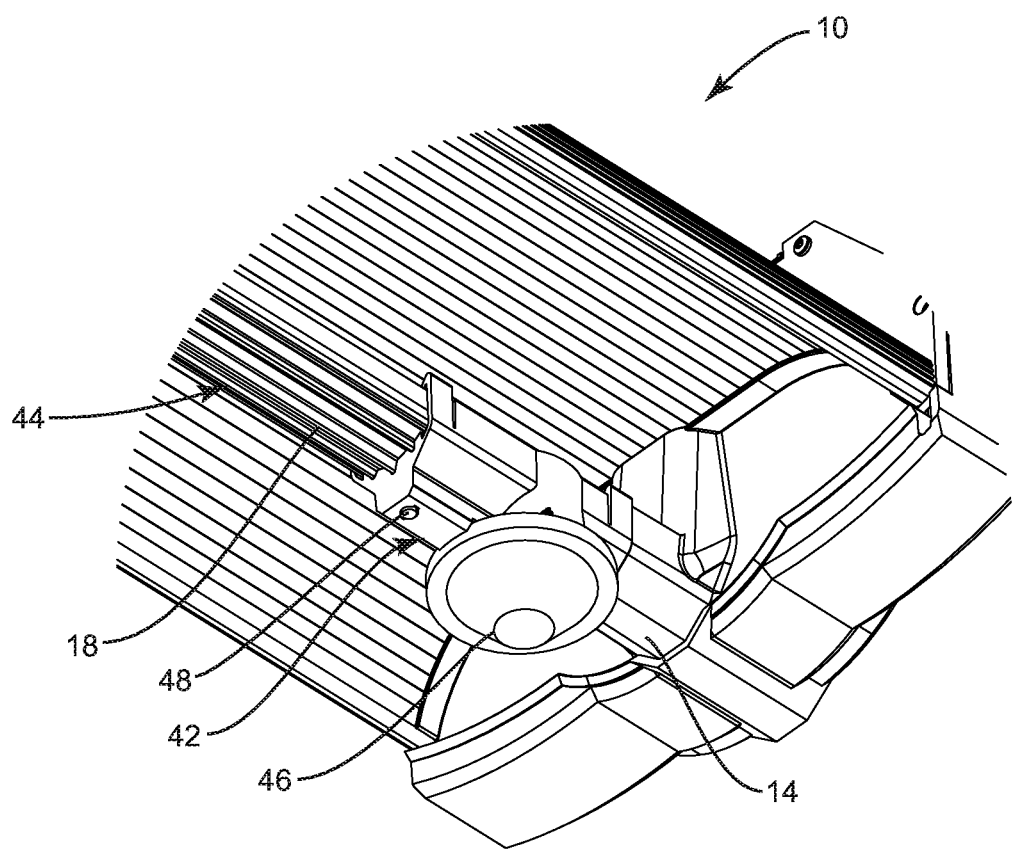
FIG. 7 illustrates a sensor module installed in a heatsink of a lighting fixture according to one embodiment of the disclosure.

With reference to FIG. 7, the bottom of one embodiment of the lighting fixture 10 is illustrated in a perspective view. In this embodiment, a sensor module 42 is shown integrated into an external surface 44 of the heatsink 18 at one end of the heatsink 18 and abutting one of the end caps 14. The sensor module 42 may include one or more sensors, such as occupancy sensors $S_O$, ambient light sensors $S_A$, temperature sensors, sound sensors (microphones), image (still or video) sensors, and the like. If multiple sensors are provided, they may be used to sense the same or different environmental conditions. If multiple sensors are used to sense the same environmental conditions, different types of sensors may be used.

As illustrated, the sensor module 42 includes lens 46, which may provide optical access for one or more sensors in the sensor module 42 to the outside environment. In one embodiment, for example, the lens 46 allows an occupancy sensor internal to the sensor module 42 to properly assess the surrounding environment. A light pipe 48 may also be provided, which is used to guide light to an internal ambient light sensor. As described in greater detail below, the sensor module 42 may clip onto the external surface 44 of the heatsink 18 using a plurality of clips that engage with the internal surface 22 of the heatsink 18.

Figure 8A:
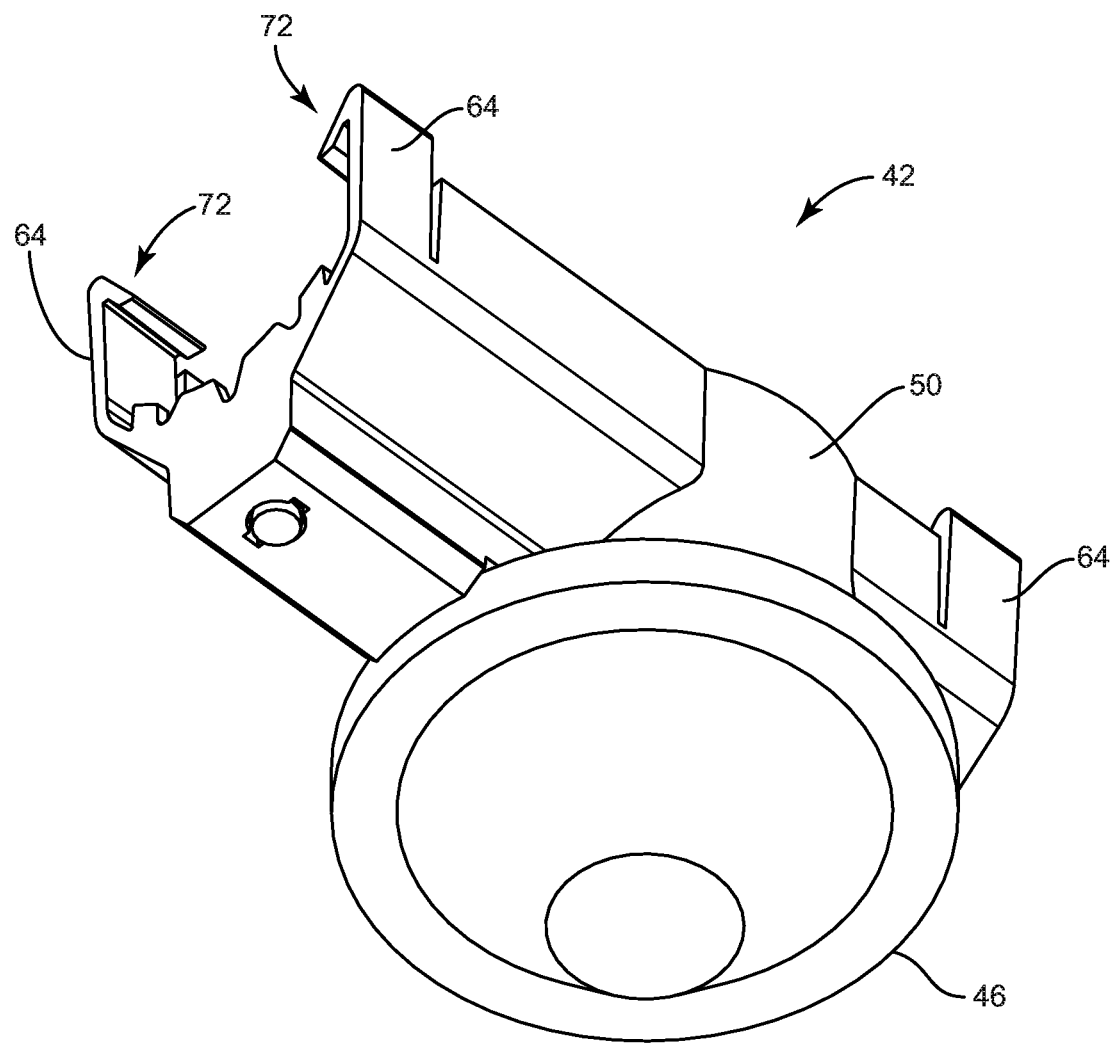
FIG. 8A illustrates a sensor module according to one embodiment of the disclosure.
Figure 8B:
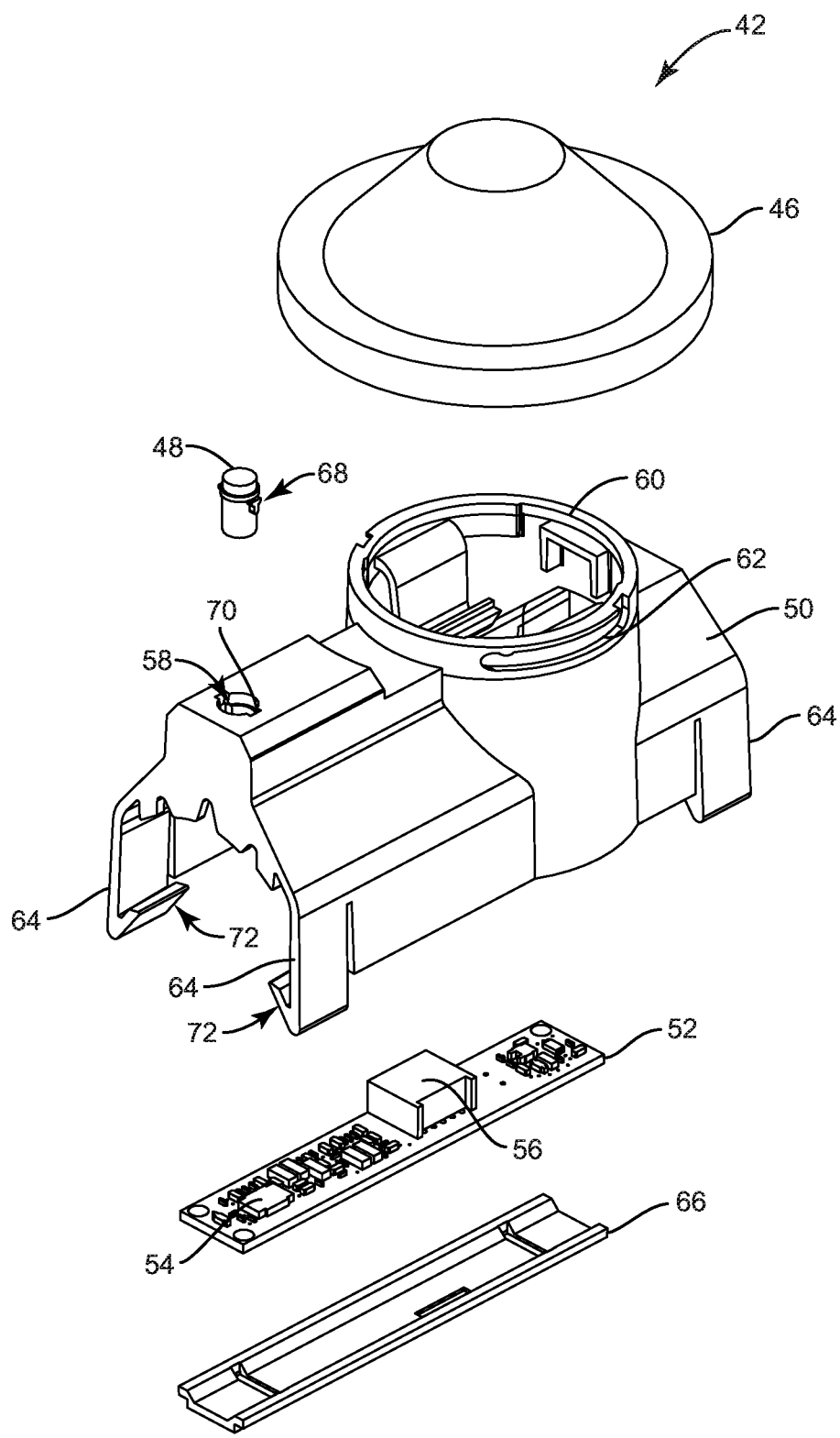
FIG. 8B is an exploded view of the sensor module of FIG. 8A.

FIGS. 8A and 8B illustrate one embodiment of the sensor module 42, which was introduced in FIG. 7. Primary reference is made to the exploded view of FIG. 8B. The sensor module 42 includes housing 50, which contains the various components of the sensor module 42. A printed circuit board (PCB) 52 mounts inside of the housing 50, and the various sensors will mount to, or at least connect to, the PCB 52. In the illustrated embodiment, an ambient light sensor 54 and an occupancy sensor 56 are mounted to the PCB 52. The ambient light sensor 54 is positioned such that it is aligned directly beneath the light pipe 48 when the light pipe 48 is inserted into a light pipe receptacle 58. The occupancy sensor 56 is aligned with an occupancy sensor opening 60 in the housing 50. Typically, the occupancy sensor 56 extends into and partially through the occupancy sensor opening 60 when the sensor module 42 is assembled, and is covered by the lens 46. According to one embodiment, the lens 46 is an off the shelf part that attaches to the housing 50 using a rotating slide-lock mechanism 62. The occupancy sensor 56 may be an off-the-shelf passive infrared (PIR) occupancy sensor. The PCB 52 includes a connector, cabling, or a wiring harness (not shown) that connects it directly or indirectly to the driver module 30 or the communications module 32.

The sensor module 42 may also include a plurality of mounting tabs 64, which are used to help attach the sensor module 42 to the heatsink 18. In this embodiment, each one of the mounting tabs 64 include an angled locking portion 72, which engages the internal surface 22 of the heatsink 18, thereby affixing the sensor module 42 to the external surface 44 of the heatsink 18. Further details regarding the mounting tabs 64 are described further below in association with FIGS. 9A through 9C.

In some embodiments, an insulating plate 66 is placed between the PCB 52 and the exposed inner portion of the housing 50. Accordingly, when the sensor module 42 is mounted on the heatsink 18, an insulating barrier will be present between the PCB 52 and the heatsink 18, which may be conductive. Providing the insulating plate 66 protects the PCB 52 and avoids the possibility of electrical shorts from the heatsink 18.

As illustrated in FIG. 8B, the light pipe 48 may snap into place in the light pipe receptacle 58. While many variants are possible, the side of the light pipe 48 may include one or more male snap-fit features 68, which are designed to releasably engage corresponding female snap-fit features 70. As illustrated, the light pipe 48 has two opposing male snap-fit features 68 (where only one is visible), and the housing 50 has two corresponding female snap-fit features 70.

The light pipe 48 is solid (as opposed to hollow) and may be formed from acrylic, polymer, glass, or the like. The light pipe 48 may include or be formed to provide various types of filtering. Further, different lengths, configurations, and materials for the light pipe 48 may provide different optical coverage and/or filtering for different light pipes 48 that fit the same light pipe receptacle 58. Light pipes 48 with different optical characteristics, but the same general form factor may be used with a given sensor module 42. As such, the light pipe 48 may be specially selected from a number of different light pipes 48 to optimize the ambient light performance of the ambient light sensor 54 for a particular installation or environment.

Figure 9A:
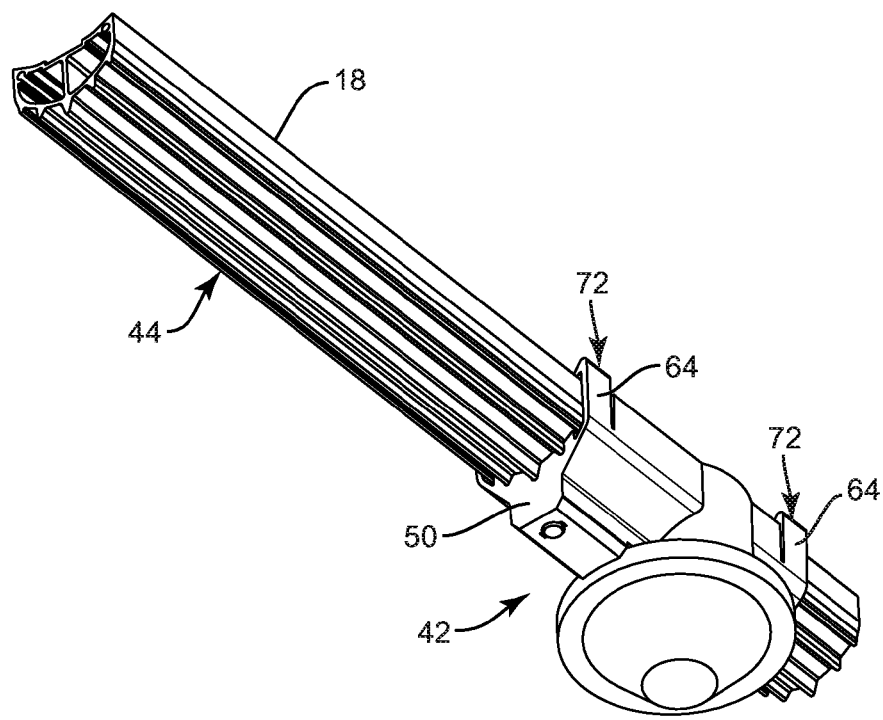
FIGS. 9A-9C illustrate installation of the sensor module into to a heatsink according to one embodiment.
Figure 9B:
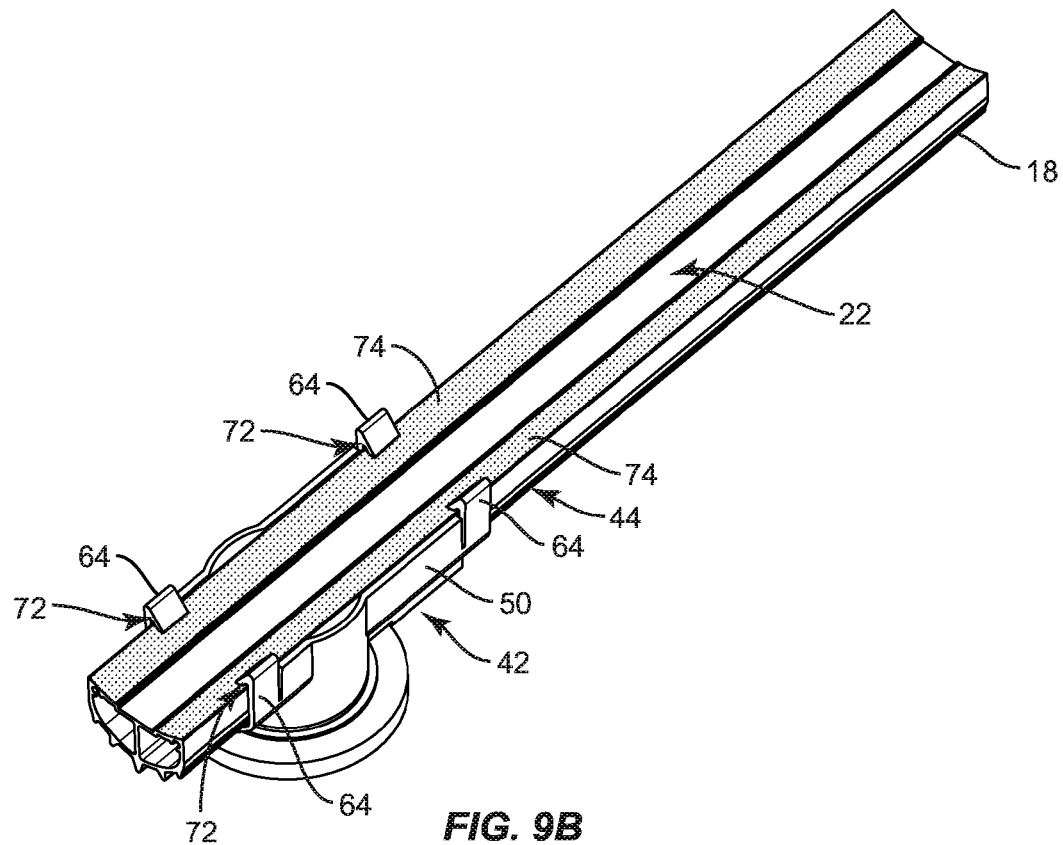
Figure 9C:
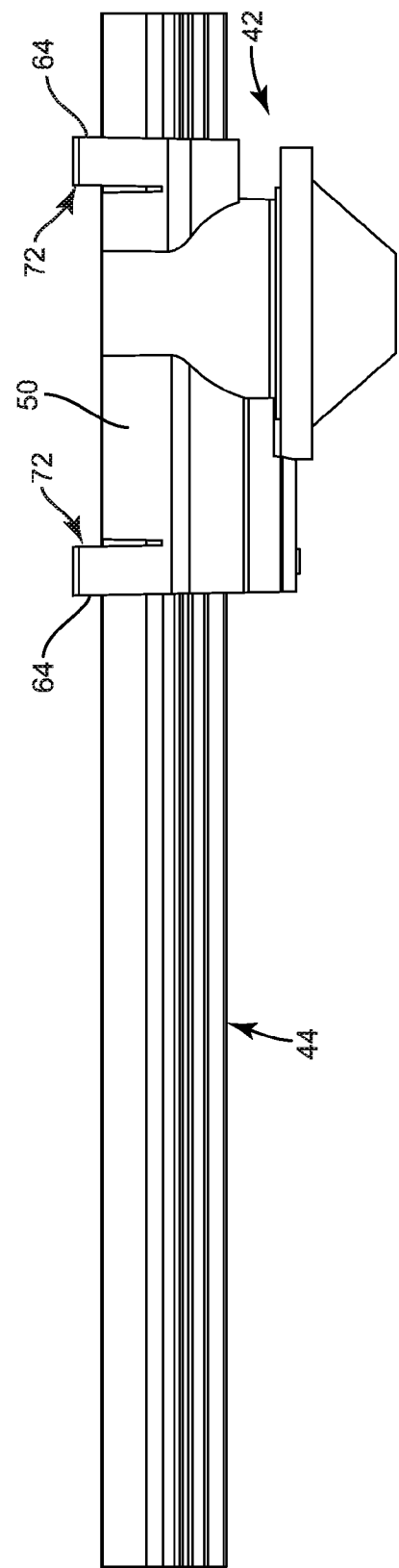

FIGS. 9A through 9C illustrate how the sensor module 42 is installed and held into place on the heatsink 18. With reference to FIGS. 9A through 9C, the sensor module 42 is shown attached to the external surface 44 of the heatsink 18 via the plurality of mounting tabs 64. To attach the sensor module 42 to the heatsink 18, the mounting tabs 64 are pointed upwards towards the internal surface 22 of the heatsink 18, and pressure is applied to the sensor module 42. As the mounting tabs 64 slide along each side of the external surface 44 of the heatsink 18, an angled locking portion 72 of each one of the mounting tabs 64 causes each one of the mounting tabs 64 to expand outwards, thereby allowing the sensor module 42 to move into place. As the inner portion of the housing 50 of the sensor module 42 comes into contact with the external surface 44 of the heatsink 18, the angled locking portion 72 of each one of the mounting tabs 64 extends over the edge of the external surface 44 of the heatsink 18, and moves inward, thereby engaging with the internal surface 22 of the heatsink 18.

In some embodiments, the internal surface 22 of the heatsink 18 is lined with a reflective paper 74. The reflective paper 74 may allow for better light transmission from the LED array 24. In this embodiment, the angled locking portion 72 of each one of the mounting tabs 64 may include a sharp edge, which is exposed to the internal surface 22 of the heatsink 18 and configured to bite into the reflective paper 74 in order to increase the friction between the heatsink 18 and the sensor module 42 and more securely engage the sensor module 42 to the heatsink 18.

When aesthetics are important, the external surfaces of the sensor module 42, such as the housing 50, are shaped to allow the sensor module 42 to aesthetically blend in with the heatsink 18, the end cap 14, or both. In the illustrated embodiments, the angled side walls of the housing 50 of the sensor module 42 continue the plane of the angled side walls of the of the heatsink 18 and/or the end cap 14. The housing 50 of the sensor module 42 may have the same color as the heatsink 18. The materials used to form the housing 50 may be metal, plastic, or the like. If formed from conductive materials, the PCB 52 will need to be electrically isolated from the housing 50. If formed from insulator materials, the housing 50 will provide electrical insulation for the PCB 52, occupancy sensor 56, ambient light sensor 54, and any other electrical components.

Figure 10:
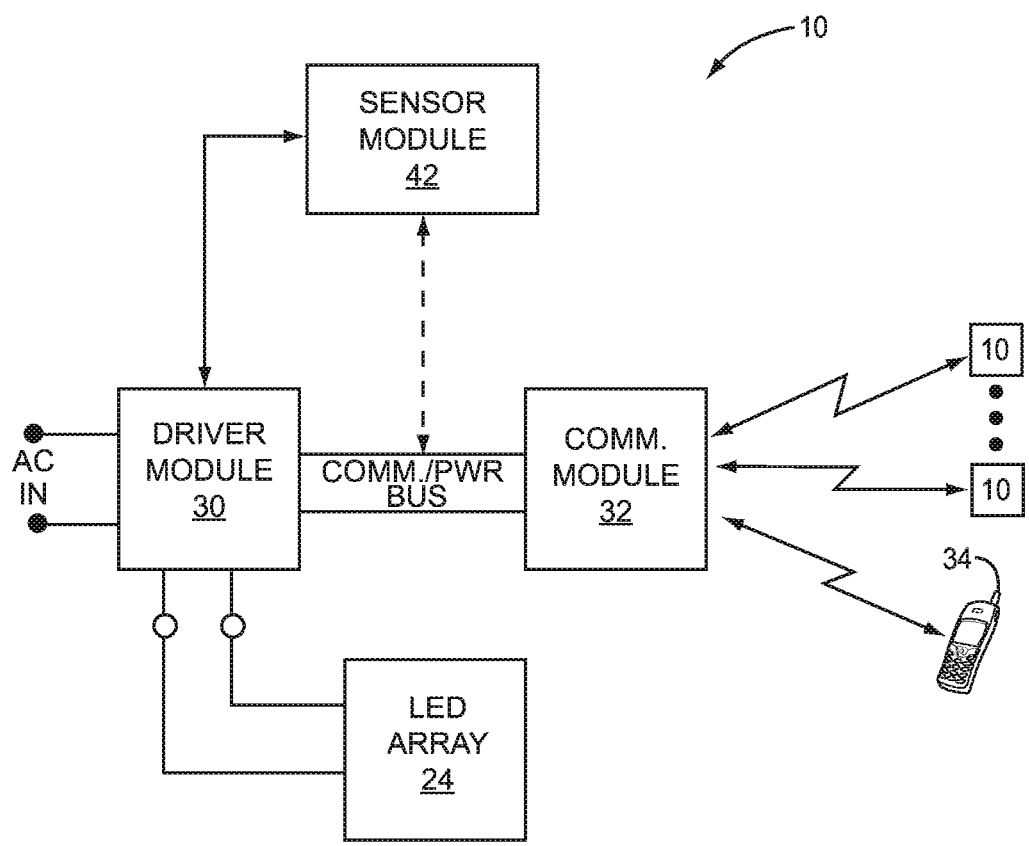
FIG. 10 is a block diagram of a lighting system according to one embodiment of the disclosure.

Turning now to FIG. 10, a block diagram of a lighting fixture 10 is provided according to one embodiment. Assume for purposes of discussion that the driver module 30, the communications module 32, and the LED array 24 are ultimately connected to form the core of the lighting fixture 10, and that the communications module 32 is configured to bidirectionally communicate with other lighting fixtures 10, the commissioning tool 34, or other control entity through wired or wireless techniques. In this embodiment, a standard communication interface and a first, or standard, protocol are used between the driver module 30 and the communications module 32. This standard protocol allows different driver modules 30 to communicate with and be controlled by different communications modules 32, assuming that both the driver module 30 and the communications module 32 are operating according to the standard protocol used by the standard communication interface. The term "standard protocol" is defined to mean any type of known or future developed, proprietary or industry-standardized protocol.

In the illustrated embodiment, the driver module 30 and the communications module 32 are coupled via communication and power buses, which may be separate or integrated with one another. The communication bus allows the communications module 32 to receive information from the driver module 30 as well as control the driver module 30. An exemplary communication bus is the well-known inter-integrated circuitry (I²C) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®, and the like.

In this embodiment, the driver module 30 is configured to collect data from the ambient light sensor $S_A$ and the occupancy sensor $S_O$ and drive the LEDs of the LED array 24. The data collected from the ambient light sensor $S_A$ and the occupancy sensor $S_O$ as well as any other operational parameters of the driver module 30 may be shared with the communications module 32. As such, the communications module 32 may collect data about the configuration or operation of the driver module 30 and any information made available to the driver module 30 by the LED array 24, the ambient light sensor $S_A$, and the occupancy sensor $S_O$. The collected data may be used by the communications module 32 to control how the driver module 30 operates, may be shared with other lighting fixtures 10 or control entities, or may be processed to generate instructions that are sent to other lighting fixtures 10. Notably, the sensor module 42 may be coupled to the communications bus instead of directly to the driver module 30, such that sensor information from the sensor module 42 may be provided to the driver module 30 or the communications module 32 via the communications bus.

The communications module 32 may also be controlled in whole or in part by a remote control entity, such as the commissioning tool 34 or another lighting fixture 10. In general, the communications module 32 will process sensor data and instructions provided by the other lighting fixtures 10 or remote control entities and then provide instructions over the communication bus to the driver module 30. An alternative way of looking at it is that the communications module 32 facilitates the sharing of the system's information, including occupancy sensing, ambient light sensing, dimmer switch settings, etc., and provides this information to the driver module 30, which then uses its own internal logic to determine what action(s) to take. The driver module 30 will respond by controlling the drive current or voltages provided to the LED array 24 as appropriate.

In certain embodiments, the driver module 30 includes sufficient electronics to process an alternating current (AC) input signal (AC IN) and provide an appropriate rectified or direct current (DC) signal sufficient to power the communications module 32, and perhaps the LED array 24. As such, the communications module 32 does not require separate AC-to-DC conversion circuitry to power the electronics residing therein, and can simply receive DC power from the driver module 30 over the power bus. Similarly, the sensor module 42 may receive power directly from the driver module 30 or via the power bus, which is powered by the driver module 30 or other source. The sensor module 42 may also be coupled to a power source independently of the driver module 30 and the communications module 32.

In one embodiment, one aspect of the standard communication interface is the definition of a standard power delivery system. For example, the power bus may be set to a low voltage level, such as 5 volts, 12 volts, 24 volts, or the like. The driver module 30 is configured to process the AC input signal to provide the defined low voltage level and provide that voltage over the power bus, thus the communications module 32 or auxiliary devices, such as the sensor module 42, may be designed in anticipation of the desired low voltage level being provided over the power bus by the driver module 30 without concern for connecting to or processing an AC signal to a DC power signal for powering the electronics of the communications module 32 or the sensor module 42.

Figure 11:
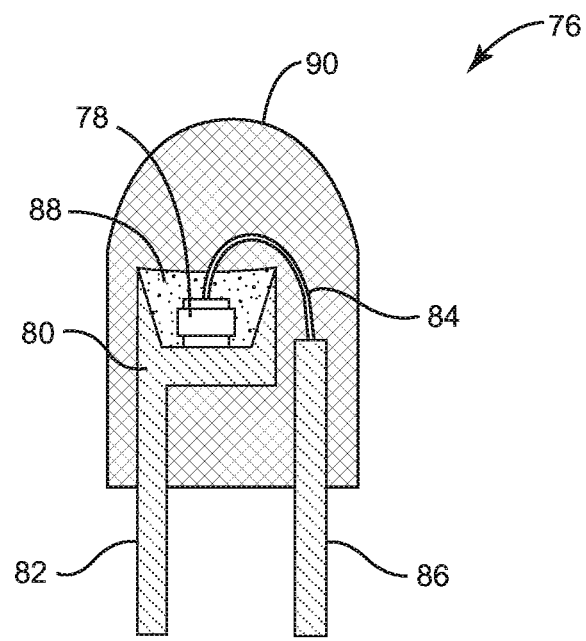
FIG. 11 is a cross section of an exemplary LED according to a first embodiment of the disclosure.

A description of an exemplary embodiment of the LED array 24, the driver module 30, and the communications module 32 follows. As noted, the LED array 24 includes a plurality of LEDs, such as LEDs 76 illustrated in FIGS. 13 and 14. With reference to FIG. 11, a single LED chip 78 is mounted on a reflective cup 80 using solder or a conductive epoxy, such that ohmic contacts for the cathode (or anode) of the LED chip 78 are electrically coupled to the bottom of the reflective cup 80. The reflective cup 80 is either coupled to or integrally formed with a first lead 82 of the LED 76. One or more bond wires 84 connect ohmic contacts for the anode (or cathode) of the LED chip 78 to a second lead 86.

The reflective cup 80 may be filled with an encapsulant material 88 that encapsulates the LED chip 78. The encapsulant material 88 may be clear or contain a wavelength conversion material, such as a phosphor, which is described in greater detail below. The entire assembly is encapsulated in a clear protective resin 90, which may be molded in the shape of a lens to control the light emitted from the LED chip 78.

Figure 12:
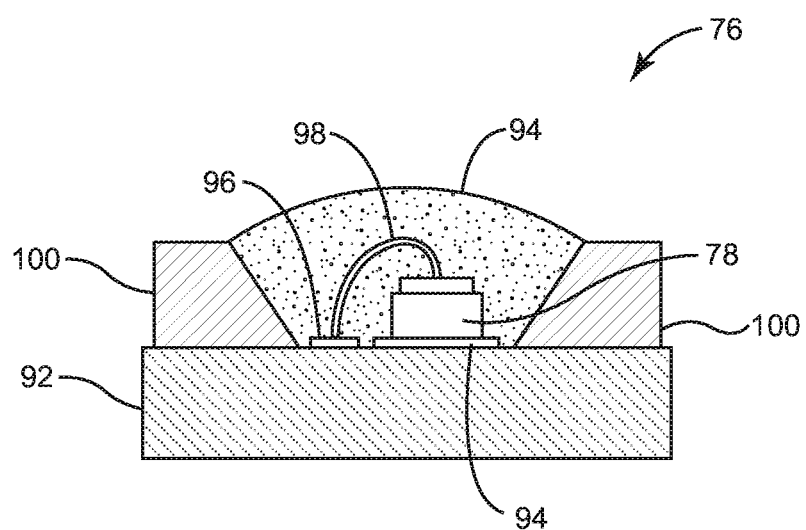
FIG. 12 is a cross section of an exemplary LED according to a second embodiment of the disclosure.

An alternative package for an LED 76 is illustrated in FIG. 12 wherein the LED chip 78 is mounted on a substrate 92. In particular, the ohmic contacts for the anode (or cathode) of the LED chip 78 are directly mounted to first contact pads 94 on the surface of the substrate 92. The ohmic contacts for the cathode (or anode) of the LED chip 78 are connected to second contact pads 96, which are also on the surface of the substrate 92, using bond wires 98. The LED chip 78 resides in a cavity of a reflector structure 100, which is formed from a reflective material and functions to reflect light emitted from the LED chip 78 through the opening formed by the reflector structure 100. The cavity formed by the reflector structure 100 may be filled with the encapsulant material 88 that encapsulates the LED chip 78. The encapsulant material 88 may be clear or contain a wavelength conversion material, such as a phosphor.

Figure 14:
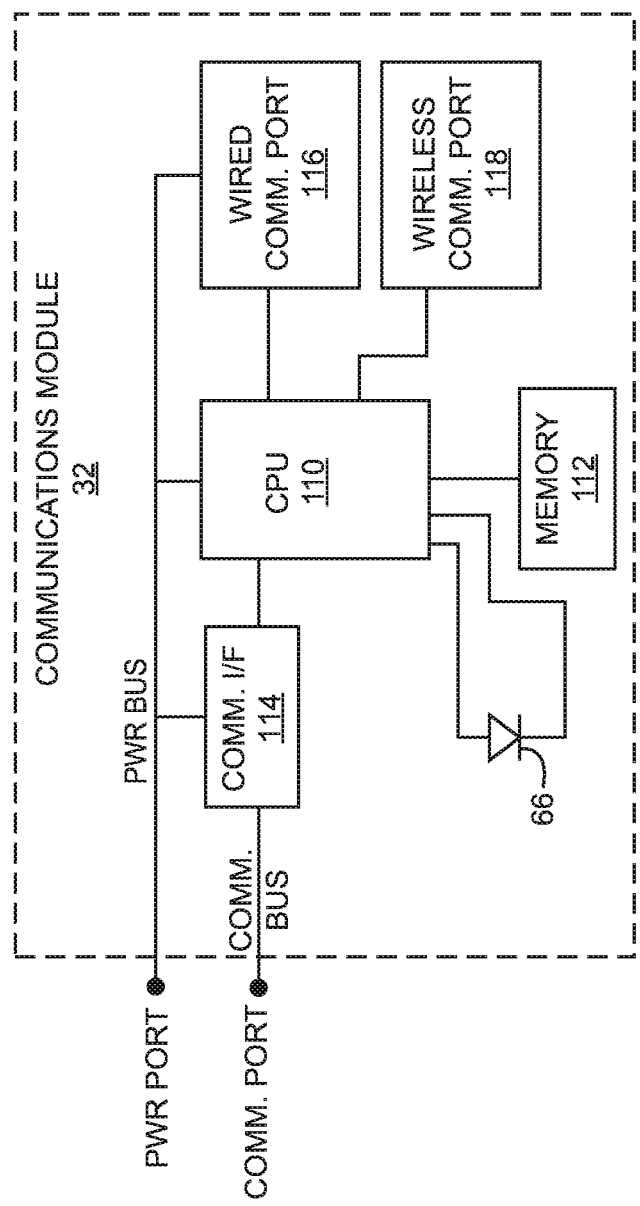
FIG. 14 is a block diagram of a communications module according to one embodiment of the disclosure.

In either of the embodiments of FIGS. 11 and 14, if the encapsulant material 88 is clear, the light emitted by the LED chip 78 passes through the encapsulant material 88 and the protective resin 90 without any substantial shift in color. As such, the light emitted from the LED chip 78 is effectively the light emitted from the LED 76. If the encapsulant material 88 contains a wavelength conversion material, substantially all or a portion of the light emitted by the LED chip 78 in a first wavelength range may be absorbed by the wavelength conversion material, which will responsively emit light in a second wavelength range. The concentration and type of wavelength conversion material will dictate how much of the light emitted by the LED chip 78 is absorbed by the wavelength conversion material as well as the extent of the wavelength conversion. In embodiments where some of the light emitted by the LED chip 78 passes through the wavelength conversion material without being absorbed, the light passing through the wavelength conversion material will mix with the light emitted by the wavelength conversion material. Thus, when a wavelength conversion material is used, the light emitted from the LED 76 is shifted in color from the actual light emitted from the LED chip 78.

For example, the LED array 24 may include a group of BSY or BSG LEDs 76 as well as a group of red LEDs 76. BSY LEDs 76 include an LED chip 78 that emits bluish light, and the wavelength conversion material is a yellow phosphor that absorbs the blue light and emits yellowish light. Even if some of the bluish light passes through the phosphor, the resultant mix of light emitted from the overall BSY LED 76 is yellowish light. The yellowish light emitted from a BSY LED 76 has a color point that falls above the Black Body Locus (BBL) on the 1931 CIE chromaticity diagram wherein the BBL corresponds to the various color temperatures of white light.

Similarly, BSG LEDs 76 include an LED chip 78 that emits bluish light; however, the wavelength conversion material is a greenish phosphor that absorbs the blue light and emits greenish light. Even if some of the bluish light passes through the phosphor, the resultant mix of light emitted from the overall BSG LED 76 is greenish light. The greenish light emitted from a BSG LED 76 has a color point that falls above the BBL on the 1931 CIE chromaticity diagram wherein the BBL corresponds to the various color temperatures of white light.

The red LEDs 76 generally emit reddish light at a color point on the opposite side of the BBL as the yellowish or greenish light of the BSY or BSG LEDs 76. As such, the reddish light from the red LEDs 76 mixes with the yellowish or greenish light emitted from the BSY or BSG LEDs 76 to generate white light that has a desired color temperature and falls within a desired proximity of the BBL. In effect, the reddish light from the red LEDs 76 pulls the yellowish or greenish light from the BSY or BSG LEDs 76 to a desired color point on or near the BBL. Notably, the red LEDs 76 may have LED chips 78 that natively emit reddish light wherein no wavelength conversion material is employed. Alternatively, the LED chips 78 may be associated with a wavelength conversion material, wherein the resultant light emitted from the wavelength conversion material and any light that is emitted from the LED chips 78 without being absorbed by the wavelength conversion material mixes to form the desired reddish light.

The blue LED chip 78 used to form either the BSY or BSG LEDs 76 may be formed from a gallium nitride (GaN), indium gallium nitride (InGaN), silicon carbide (SiC), zinc selenide (ZnSe), or like material system. The red LED chip 78 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 13:
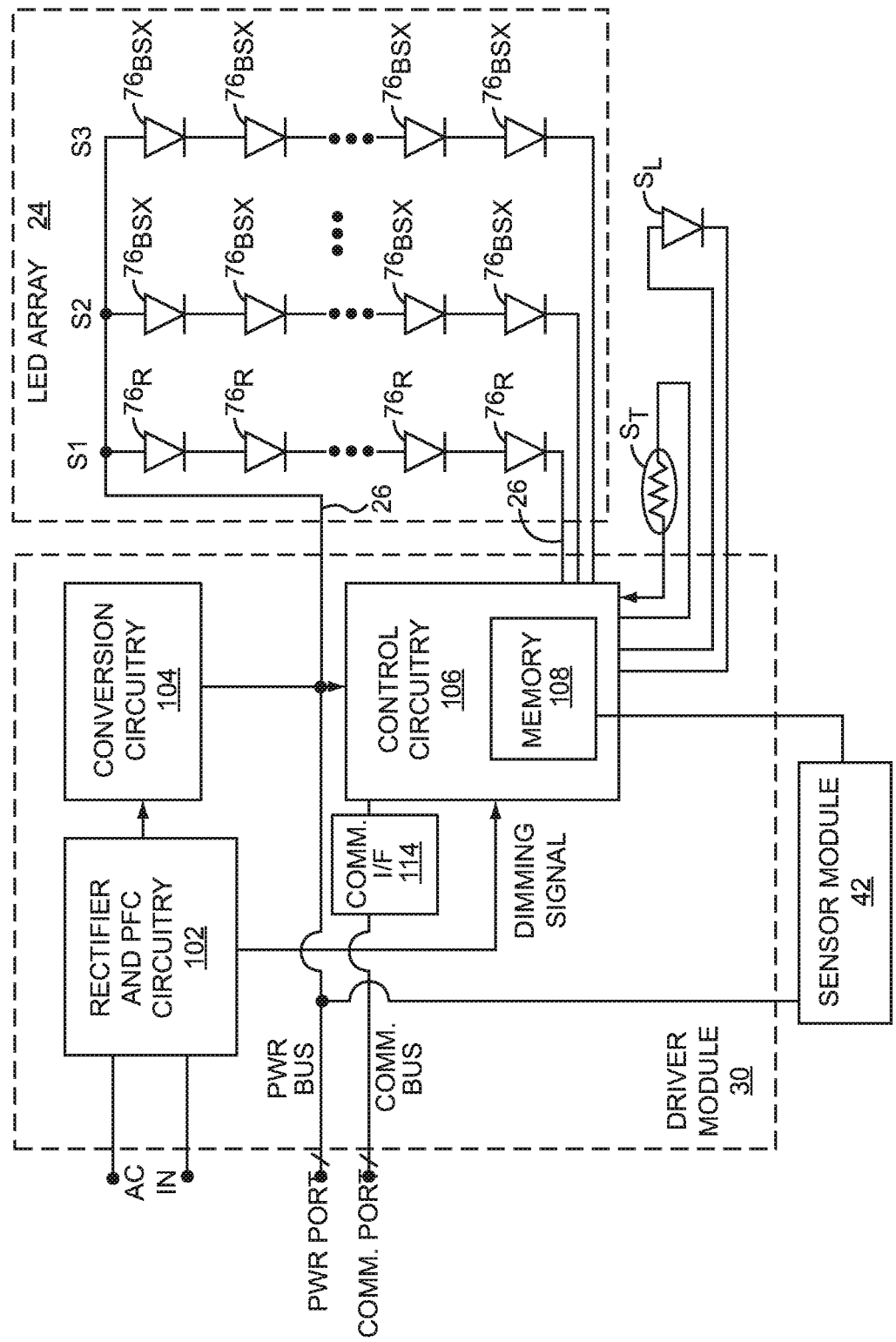
FIG. 13 is a schematic of a driver module and an LED array according to one embodiment of the disclosure.

As noted, the LED array 24 may include a mixture of red LEDs 76 and either BSY or BSG LEDs 76. The driver module 30 for driving the LED array 24 is illustrated in FIG. 13 according to one embodiment of the disclosure. The LED array 24 may be electrically divided into two or more strings of series connected LEDs 76. As depicted, there are three LED strings S1, S2, and S3. For clarity, the reference number "82" will include a subscript indicative of the color of the LED 76 in the following text where 'R' corresponds to red, 'BSY' corresponds to blue shifted yellow, 'BSC' corresponds to blue shifted green, and 'BSX' corresponds to either BSG or BSY LEDs. LED string S1 includes a number of red LEDs 76R, LED string S2 includes a number of either BSY or BSG LEDs $76_{BSX}$, and LED string S3 includes a number of either BSY or BSG LEDs $76_{BSX}$. The driver module 30 controls the current delivered to the respective LED strings S1, S2, and S3. The current used to drive the LEDs 76 is generally pulse width modulated (PWM), wherein the duty cycle of the pulsed current controls the intensity of the light emitted from the LEDs 76.

The BSY or BSG LEDs $76_{BSX}$ in the second LED string S2 may be selected to have a slightly more bluish hue (less yellowish or greenish hue) than the BSY or BSG LEDs $76_{BSX}$ in the third LED string S3. As such, the current flowing through the second and third strings S2 and S3 may be tuned to control the yellowish or greenish light that is effectively emitted by the BSY or BSG LEDs $76_{BSX}$ of the second and third LED strings S2, S3. By controlling the relative intensities of the yellowish or greenish light emitted from the differently hued BSY or BSG LEDs $76_{BSX}$ of the second and third LED strings S2, S3, the hue of the combined yellowish or greenish light from the second and third LED strings S2, S3 may be controlled in a desired fashion.

The ratio of current provided through the red LEDs 76R of the first LED string S1 relative to the currents provided through the BSY or BSG LEDs $76_{BSX}$ of the second and third LED strings S2 and S3 may be adjusted to effectively control the relative intensities of the reddish light emitted from the red LEDs 76R and the combined yellowish or greenish light emitted from the various BSY or BSG LEDs $76_{BSX}$. As such, the intensity and the color point of the yellowish or greenish light from BSY or BSG LEDs $76_{BSX}$ can be set relative to the intensity of the reddish light emitted from the red LEDs 76R. The resultant yellowish or greenish light mixes with the reddish light to generate white light that has a desired color temperature and falls within a desired proximity of the BBL.

Notably, the number of LED strings Sx may vary from one to many and different combinations of LED colors may be used in the different strings. Each LED string Sx may have LEDs 76 of the same color, variations of the same color, or substantially different colors, such as red, green, and blue. In one embodiment, a single LED string may be used, wherein the LEDs in the string are all substantially identical in color, vary in substantially the same color, or include different colors. In another embodiment, three LED strings Sx with red, green, and blue LEDs may be used, wherein each LED string Sx is dedicated to a single color. In yet another embodiment, at least two LED strings Sx may be used, wherein different colored BSY LEDs are used in one of the LED strings Sx and red LEDs are used in the other of the LED strings Sx.

The driver module 30 depicted in FIG. 13 generally includes rectifier and power factor correction (PFC) circuitry 102, conversion circuitry 104, and control circuitry 106. The rectifier and PFC circuitry 102 is adapted to receive an AC power signal (AC IN), rectify the AC power signal, and correct the power factor of the AC power signal. The resultant signal is provided to the conversion circuitry 104, which converts the rectified AC power signal to a DC power signal. The DC power signal may be boosted or bucked to one or more desired DC voltages by DC-DC converter circuitry, which is provided by the conversion circuitry 104. Internally, The DC power signal may be used to directly power the control circuitry 106 and any other circuitry provided in the driver module 30 as well as the sensor module 42.

The DC power signal is also provided to the power bus, which is coupled to one or more power ports, which may be part of the standard communication interface. The DC power signal provided to the power bus may be used to provide power to one or more external devices that are coupled to the power bus and separate from the driver module 30. These external devices may include the communications module 32 and any number of auxiliary devices, such as the sensor module 42. Accordingly, these external devices may rely on the driver module 30 for power and can be efficiently and cost effectively designed accordingly. The rectifier and PFC circuitry 102 and the conversion circuitry 104 of the driver module 30 are robustly designed in anticipation of being required to supply power to not only its internal circuitry and the LED array 24, but also to supply power to these external devices. Such a design greatly simplifies the power supply design, if not eliminating the need for a power supply, and reduces the cost for these external devices.

As illustrated, the DC power signal may be provided to another port, which will be connected by the cabling 26 to the LED array 24. In this embodiment, the supply line of the DC power signal is ultimately coupled to the first end of each of the LED strings S1, S2, and S3 in the LED array 24. The control circuitry 106 is coupled to the second end of each of the LED strings S1, S2, and S3 by the cabling 26. Based on any number of fixed or dynamic parameters, the control circuitry 106 may individually control the pulse width modulated current that flows through the respective LED strings S1, S2, and S3 such that the resultant white light emitted from the LED strings S1, S2, and S3 has a desired color temperature and falls within a desired proximity of the BBL. Certain of the many variables that may impact the current provided to each of the LED strings S1, S2, and S3 include: the magnitude of the AC power signal, the resultant white light, ambient temperature of the driver module 30 or LED array 24. Notably, the architecture used to drive the LED array 24 in this embodiment is merely exemplary, as those skilled in the art will recognize other architectures for controlling the drive voltages and currents presented to the LED strings S1, S2, and S3.

In certain instances, a dimming device controls the AC power signal. The rectifier and PFC circuitry 102 may be configured to detect the relative amount of dimming associated with the AC power signal and provide a corresponding dimming signal to the control circuitry 106. Based on the dimming signal, the control circuitry 106 will adjust the current provided to each of the LED strings S1, S2, and S3 to effectively reduce the intensity of the resultant white light emitted from the LED strings S1, S2, and S3 while maintaining the desired color temperature. Dimming instructions may alternatively be delivered from the communications module 32 to the control circuitry 106 in the form of a command via the communication bus.

The intensity or color of the light emitted from the LEDs 76 may be affected by ambient temperature. If associated with a thermistor $S_T$ or other temperature-sensing device, the control circuitry 106 can control the current provided to each of the LED strings S1, S2, and S3 based on ambient temperature in an effort to compensate for adverse temperature effects. The intensity or color of the light emitted from the LEDs 76 may also change over time. If associated with an LED light sensor $S_L$, the control circuitry 106 can measure the color of the resultant white light being generated by the LED strings S1, S2, and S3 and adjust the current provided to each of the LED strings S1, S2, and S3 to ensure that the resultant white light maintains a desired color temperature or other desired metric. The control circuitry 106 may also monitor the output of the occupancy and ambient light sensors $S_O$ and $S_A$ for occupancy and ambient light information.

The control circuitry 106 may include a central processing unit (CPU) and sufficient memory 108 to enable the control circuitry 106 to bidirectionally communicate with the communications module 32 or other devices over the communication bus through an appropriate communication interface (I/F) 114 using a defined protocol, such as the standard protocol described above. The control circuitry 106 may receive instructions from the communications module 32 or other device and take appropriate action to implement the received instructions. The instructions may range from controlling how the LEDs 76 of the LED array 24 are driven to returning operational data, such as temperature, occupancy, light output, or ambient light information, that was collected by the control circuitry 106 to the communications module 32 or other device via the communication bus. As described further below in association with FIG. 14, the functionality of the communications module 32 may be integrated into the driver module 30, and vice versa.

With reference to FIG. 14, a block diagram of one embodiment of the communications module 32 is illustrated. The communications module 32 includes a CPU 110 and associated memory 112 that contains the requisite software instructions and data to facilitate operation as described herein. The CPU 110 may be associated with a communication interface 114, which is to be coupled to the driver module 30, directly or indirectly via the communication bus. The CPU 110 may be associated with a wired communication port 116, a wireless communication port 118, or both, to facilitate wired or wireless communications with other lighting fixtures 10 and remote control entities. The wireless communication port 118 may include the requisite transceiver electronics to facilitate wireless communications with remote entities. The wired communication port 116 may support universal serial (USB), Ethernet, or like interfaces.

The capabilities of the communications module 32 may vary greatly from one embodiment to another. For example, the communications module 32 may act as a simple bridge between the driver module 30 and the other lighting fixtures 10 or remote control entities. In such an embodiment, the CPU 110 will primarily pass data and instructions received from the other lighting fixtures 10 or remote control entities to the driver module 30, and vice versa. The CPU 110 may translate the instructions as necessary based on the protocols being used to facilitate communications between the driver module 30 and the communications module 32 as well as between the communications module 32 and the remote control entities. In other embodiments, the CPU 110 plays an important role in coordinating intelligence and sharing data among the lighting fixtures 10 as well as providing significant, if not complete, control of the driver module 30. While the communications module 32 may be able to control the driver module 30 by itself, the CPU 110 may also be configured to receive data and instructions from the other lighting fixtures 10 or remote control entities and use this information to control the driver module 30. The communications module 32 may also provide instructions to other lighting fixtures 10 and remote control entities based on the sensor data from the associated driver module 30 as well as the sensor data and instructions received from the other lighting fixtures 10 and remote control entities.

Power for the CPU 110, memory 112, the communication interface 114, and the wired and/or wireless communication ports 116 and 118 may be provided over the power bus via the power port. As noted above, the power bus may receive its power from the driver module 30, which generates the DC power signal. As such, the communications module 32 may not need to be connected to AC power or include rectifier and conversion circuitry. The power port and the communication port may be separate or may be integrated with the standard communication interface. The power port and communication port are shown separately for clarity. The communication bus may take many forms. In one embodiment, the communication bus is a 2-wire serial bus, wherein the connector or cabling configuration may be configured such that the communication bus and the power bus are provided using four wires: data, clock, power, and ground.

Those skilled in the art will recognize improvements and modifications to the embodiments of the present disclosure. All such improvements and modifications are considered within the scope of the concepts disclosed herein and the claims that follow.

What is claimed is:
1. A lighting fixture comprising:
a main structure;
a light source provided within the main structure and configured such that light emitted from the light source is directed out of the main structure toward an illuminated area;
a heatsink coupled to the lighting fixture below the main structure and thermally coupled to the light source, the heatsink having an internal surface, which houses the light source and is exposed to the main structure, and an external surface, which is opposite the internal surface and is exposed to the illuminated area; and
a sensor module coupled to the external surface of the heatsink such that the sensor module is below the heatsink.

2. The lighting fixture of claim 1 wherein the sensor module is coupled to the external surface of the heatsink by a plurality of tabs, such that the tabs wrap around the external surface of the heatsink and engage the internal surface of the heatsink.

3. The lighting fixture of claim 1 wherein the sensor module includes at least one environmental sensor associated with the sensor module.

4. The lighting fixture of claim 3 wherein the at least one environmental sensor is one of an occupancy sensor and an ambient light sensor.

5. The lighting fixture of claim 3 wherein the at least one environmental sensor is mounted on a printed circuit board (PCB), which is contained in the sensor module.

6. The lighting fixture of claim 5, wherein the PCB is coupled between a housing of the sensor module and an insulating plate, such that when the sensor module is coupled to the external surface of the heatsink, the insulating plate electrically isolates the PCB from the heatsink.

7. The lighting fixture of claim 3 wherein the at least one environmental sensor is exposed through an opening in a housing of the sensor module.

8. The lighting fixture of claim 7 wherein the at least one environmental sensor is covered by a lens, which is attached to the housing of the sensor module.

9. The lighting fixture of claim 8 wherein the lens is conical.

10. The lighting fixture of claim 8 wherein the lens is attached to the housing of the sensor module via a twist-on connector.

11. The lighting fixture of claim 1 wherein the heatsink is coupled to the main structure via one or more end caps.

12. The lighting fixture of claim 11 wherein the sensor module directly abuts one of the one or more end caps.

13. The lighting fixture of claim 12 wherein contours of the one or more end caps are substantially consistent with contours of the sensor module.

14. The lighting fixture of claim 1 wherein the internal surface of the heatsink is lined with a reflective paper.

15. The lighting fixture of claim 14 wherein the sensor module is coupled to the external surface of the heatsink by a plurality of tabs, such that the tabs wrap around the external surface of the heatsink and engage the reflective paper lining the internal surface of the heatsink.

16. The lighting fixture of claim 15 wherein a portion of one or more of the plurality of tabs engaging the reflective paper is angled such that a sharp edge of the tabs engages the reflective paper.

17. A sensor module for a lighting fixture housing a light source on a top surface of a heatsink, the sensor module comprising:
a housing;
at least one environmental sensor exposed through the housing;

a lens attached to the housing and covering the at least one environmental sensor; and a connection mechanism configured to engage a bottom surface of the heatsink, which is opposite the top surface.

18. The sensor module of claim 17 wherein:
the connection mechanism is a plurality of tabs, such that the tabs wrap around the bottom surface of the heatsink and engage the top surface of the heatsink.

19. The sensor module of claim 18 wherein the top surface of the heatsink is lined with a reflective paper.

20. The sensor module of claim 19 wherein the plurality of tabs engage the reflective paper lining the top surface of the heatsink.

21. The sensor module of claim 20 wherein a portion of the one or more plurality of tabs engaging the reflective paper is angled such that a sharp edge of the tabs engages the reflective paper.

22. The sensor module of claim 17 wherein the at least one environmental sensor is one of an occupancy sensor and an ambient light sensor.

23. The sensor module of claim 17 wherein the at least one environmental sensor is mounted on a printed circuit board (PCB), which is contained in the sensor module.

24. The sensor module of claim 23 wherein the PCB is coupled between the housing and an insulating plate, such that when the sensor module is coupled to an external surface of the heatsink, the insulating plate electrically isolates the PCB from the heatsink.

25. The sensor module of claim 17 wherein the lens is conical.

26. The sensor module of claim 17 wherein the lens is attached to the housing of the sensor module via a twist-on connector.

* * * * *